United States Patent
Nania

(10) Patent No.: US 10,421,341 B2
(45) Date of Patent: Sep. 24, 2019

(54) VEHICLE WITH MOONROOF AND PANORAMIC GLASS

(71) Applicant: Ford Global Technologies, LLC, Dearborn, MI (US)

(72) Inventor: Adrian Nania, Rochester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/825,001

(22) Filed: Nov. 28, 2017

(65) Prior Publication Data

US 2018/0126832 A1    May 10, 2018

Related U.S. Application Data

(62) Division of application No. 14/972,443, filed on Dec. 17, 2015, now Pat. No. 9,862,255.

(51) Int. Cl.
| | |
|---|---|
| *B60J 7/047* | (2006.01) |
| *B60J 1/02* | (2006.01) |
| *B60J 1/00* | (2006.01) |
| *B60J 7/02* | (2006.01) |
| *B60J 7/043* | (2006.01) |

(52) U.S. Cl.
CPC ............. *B60J 7/047* (2013.01); *B60J 1/007* (2013.01); *B60J 7/022* (2013.01); *B60J 7/0435* (2013.01)

(58) Field of Classification Search
CPC ... B60J 1/004; B60J 1/007; B60J 7/007; B60J 7/047; B60J 7/0435; B60J 7/022
USPC ............................................. 296/216.01–224
See application file for complete search history.

(56) References Cited

U.S. PATENT DOCUMENTS

| | | | |
|---|---|---|---|
| 4,243,261 A | 1/1981 | Trenkler | |
| 4,654,946 A | 4/1987 | Phillips | |
| 4,786,102 A | 11/1988 | Sakamoto et al. | |
| 4,801,174 A | 1/1989 | Hirshberg et al. | |
| 5,009,463 A | 4/1991 | Saitoh et al. | |
| 5,791,728 A | 8/1998 | Hausrath | |
| 6,367,872 B1 | 4/2002 | Bohm et al. | |
| 6,493,915 B2 | 12/2002 | Zonneveld et al. | |
| 6,508,507 B2 | 1/2003 | Raasakka | |
| 6,793,277 B2 | 9/2004 | Chon et al. | |
| 6,830,290 B2 | 12/2004 | De Gaillard | |
| 6,942,285 B2* | 9/2005 | Manders | B60J 7/0435 296/216.03 |
| 7,086,693 B1 | 8/2006 | Huisman | |
| 7,314,246 B2 | 1/2008 | MacNee, III et al. | |

(Continued)

FOREIGN PATENT DOCUMENTS

| | | |
|---|---|---|
| CN | 1911696 A1 | 2/2007 |
| CN | 202986767 U | 6/2013 |

(Continued)

OTHER PUBLICATIONS

993 Series (1994-1998), http://www.porschepassion.com/993.html, (5 pages).

*Primary Examiner* — Dennis H Pedder
(74) *Attorney, Agent, or Firm* — Vichit Chea; Bejin Bieneman PLC

(57) ABSTRACT

A vehicle includes a windshield, a backlite spaced from the windshield, and a moonroof. The moonroof is moveable relative to the windshield and the backlite between a closed position and an open position. When in the closed position, the moonroof is adjacent to both the windshield and the backlite.

14 Claims, 8 Drawing Sheets

(56) References Cited

U.S. PATENT DOCUMENTS

| | | | |
|---|---|---|---|
| 7,611,189 B2 | 11/2009 | Nielander et al. | |
| 8,282,158 B2 | 10/2012 | Verhee | |
| 9,162,556 B2 | 10/2015 | Song et al. | |
| 9,248,725 B2 | 2/2016 | Comfort et al. | |
| 2001/0017478 A1 | 8/2001 | Reinsch | |
| 2003/0015891 A1 | 1/2003 | Doll et al. | |
| 2003/0075948 A1 | 4/2003 | De Gaillard | |
| 2003/0214157 A1 | 11/2003 | De Gaillard | |
| 2007/0114817 A1 | 5/2007 | Becher et al. | |
| 2007/0182217 A1 | 8/2007 | Saleen et al. | |
| 2009/0033128 A1 | 2/2009 | Hoetzel | |
| 2015/0266361 A1* | 9/2015 | Pollak | B60J 7/047 296/216.05 |
| 2016/0059771 A1* | 3/2016 | Meinzer | B60Q 1/323 362/464 |

FOREIGN PATENT DOCUMENTS

| | | |
|---|---|---|
| EP | 0101322 A2 | 2/1984 |
| EP | 1031448 A2 | 8/2000 |
| EP | 2353905 A1 | 8/2011 |
| JP | 2015000661 A | 1/2015 |
| KR | 100453405 B1 | 10/2004 |
| WO | 9702171 | 1/1997 |

* cited by examiner

VEHICLE WITH MOONROOF AND PANORAMIC GLASS

CROSS-REFERENCE TO RELATED APPLICATIONS

This application claims priority to and is a divisional of U.S. patent application Ser. No. 14/972,443 filed on Dec. 17, 2015 entitled "VEHICLE WITH MOONROOF AND PANORAMIC GLASS," the contents of which is hereby incorporated by reference in its entirety.

BACKGROUND

Consumer demand exists for vehicles with moonroofs built into a panoramic glass exterior, that is, a uniform appearance of glass from the windshield to the backlite. Designing vehicles with these features creates tensions among design considerations including styling, occupant headroom, safety, the torsional rigidity of the vehicle, complexity, and durability.

A large panoramic moonroof can decrease the torsional rigidity by displacing some of the frame of the vehicle that would have been located in the roof, and it can impinge on headroom because the drive motor of the moonroof may be located in the rear center of the vehicle, only leaving room for a short rear middle passenger.

On the other hand, a smaller moonroof requires adding additional glass panels between the moonroof and the windshield or backlite or both. Additional glass panels introduce more "split lines" that divide the glass panes and may mar the styling. They also add complexity to the design of the vehicle by adding more parts, such as mountings, as well as necessitating different parts for moonroof and non-moonroof versions of the same vehicle model. Finally, the panels decrease durability by increasing maintenance demands and providing additional paths for water leaks.

Accordingly, an opportunity exists to design a vehicle that provides attractive styling and spacious passenger headroom while maintaining safety and torsional rigidity, minimizing complexity, and enhancing durability.

DETAILED DESCRIPTION

Figure 1:
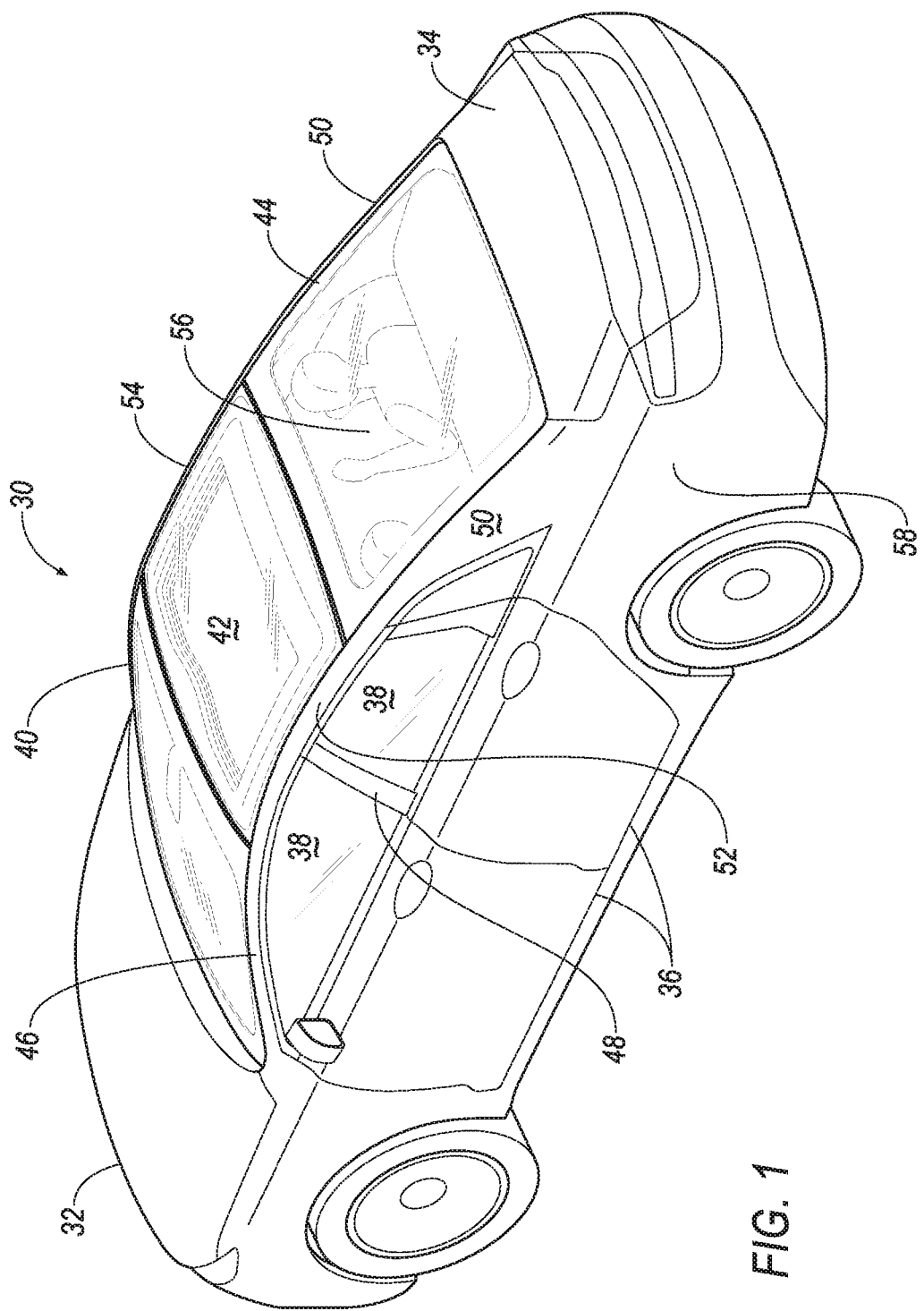
FIG. 1 is a perspective view of a vehicle.

With reference to the Figures, wherein like numerals indicate like parts throughout the several views, a vehicle 30 includes a windshield 40, a backlite 44 spaced from the windshield 40, and a moonroof 42. The moonroof 42 is moveable relative to the windshield 40 and relative to the backlite 44 between a closed position (as in FIG. 1) and an open position (as in FIG. 4). When in the closed position, the moonroof 42 is adjacent to both the windshield 40 and the backlite 44.

Since the moonroof 42 is adjacent to both the windshield 40 and the backlite 44 in the closed position, the vehicle 30 has an appearance of uniform glass running from the windshield 40 back to the backlite 44 with only two split lines. This configuration provides an aesthetically pleasing appearance. This configuration may also improve headroom for a rear passengers, reduce design complexity, and/or increase durability of a moonroof assembly 70 of which the moonroof 42 is a component, as set forth further below With reference to FIGS. 1-3, the vehicle 30 includes a body 58 supporting body panels (not numbered). The body panels include a hood 32, a decklid 34, and doors 36. The windshield 40, the moonroof 42, and the backlite 44 are disposed between the hood 32 and the decklid 34. Specifically, the windshield 40 extends from the decklid 34 to the moonroof 42, the moonroof 42 extends from the windshield 40 to the backlite 44, and the backlite 44 extends from the moonroof 42 to the decklid 34.

Figure 2:
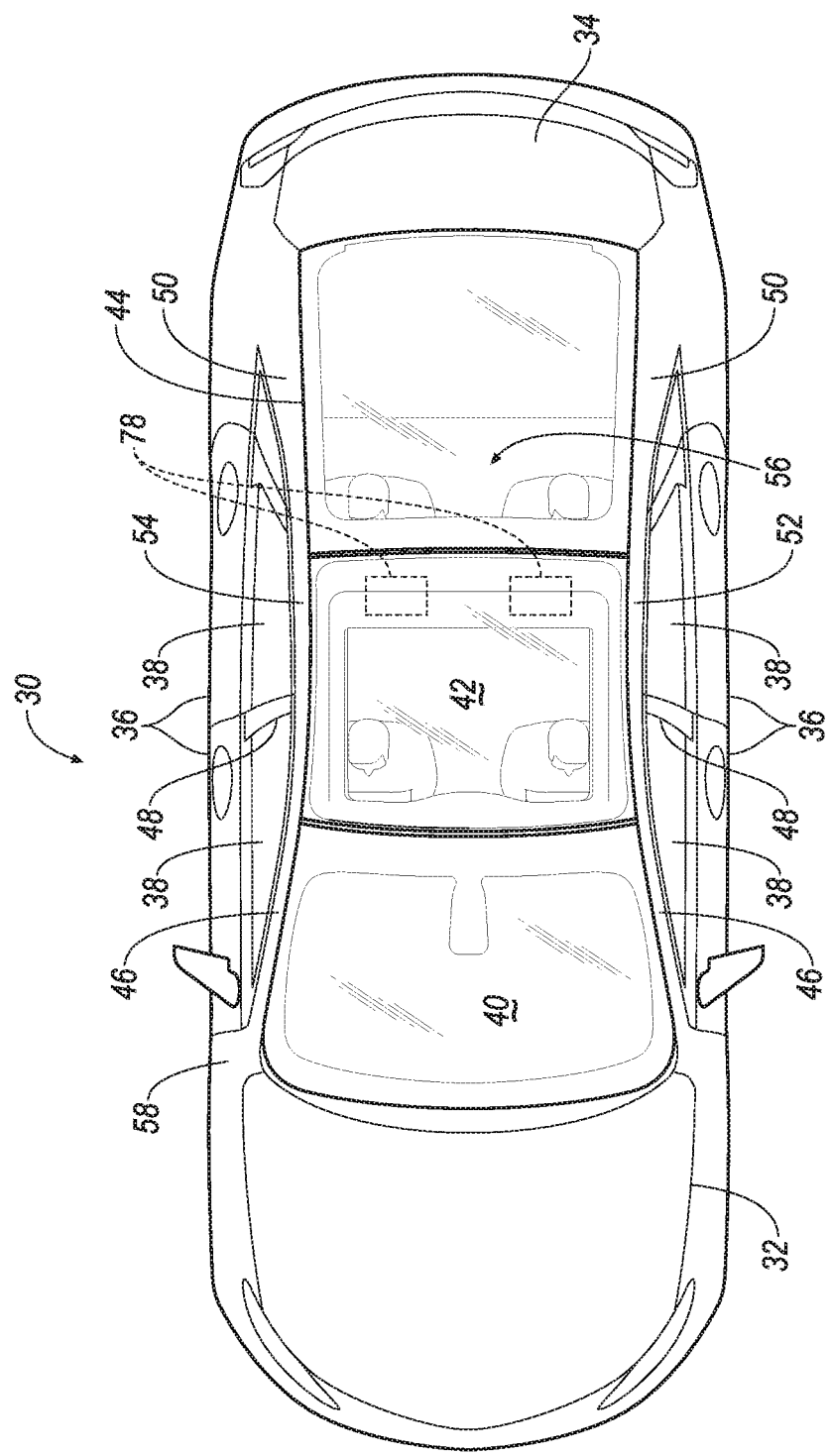
FIG. 2 is a top view of the vehicle.

With reference to FIGS. 1 and 2, each door 36 may include a side window 38. The body 58 of the vehicle 30 includes A pillars 46, B pillars 48, and C pillars 50. The A pillars may extend between the windshield 34 from the side windows 38. The B pillars may extend between the side windows 38 of adjacent doors 36. The C pillar may extend between the side windows 38 and the backlite. A left end roof rail 52 and a right end roof rail 54 extend across the A pillars 46, B pillars 48, and C pillars 50. The left end roof rail 52 and the right end roof rail 54 define a top of the vehicle 30 and divide the doors 36 from the moonroof 42. The windshield 40, moonroof 42, backlite 44, and doors 36 enclose a passenger cabin 56.

The left end roof rail 52 and the right end roof rail 54 are spaced apart to define an opening 64 between the windshield 40 and the backlite 44. The body 58 provides the structural support for the vehicle 30 and helps the vehicle 30 maintain its shape in response to forces exerted on it. The body 58 may be of a unibody construction in which at least some of the body 58 is exposed and may present a class-A surface (not numbered), i.e., a surface specifically manufactured to have a high-quality, finished aesthetic appearance free of blemishes. For example, the roof rails 52 and 54, the A pillars 46, and the C pillars 50 may be exposed and may present class-A surfaces. The B pillar 48 may be visible when the doors 36 are open. The frame 58 can be formed of any suitable material, for example, steel, aluminum, etc.

Figure 5:
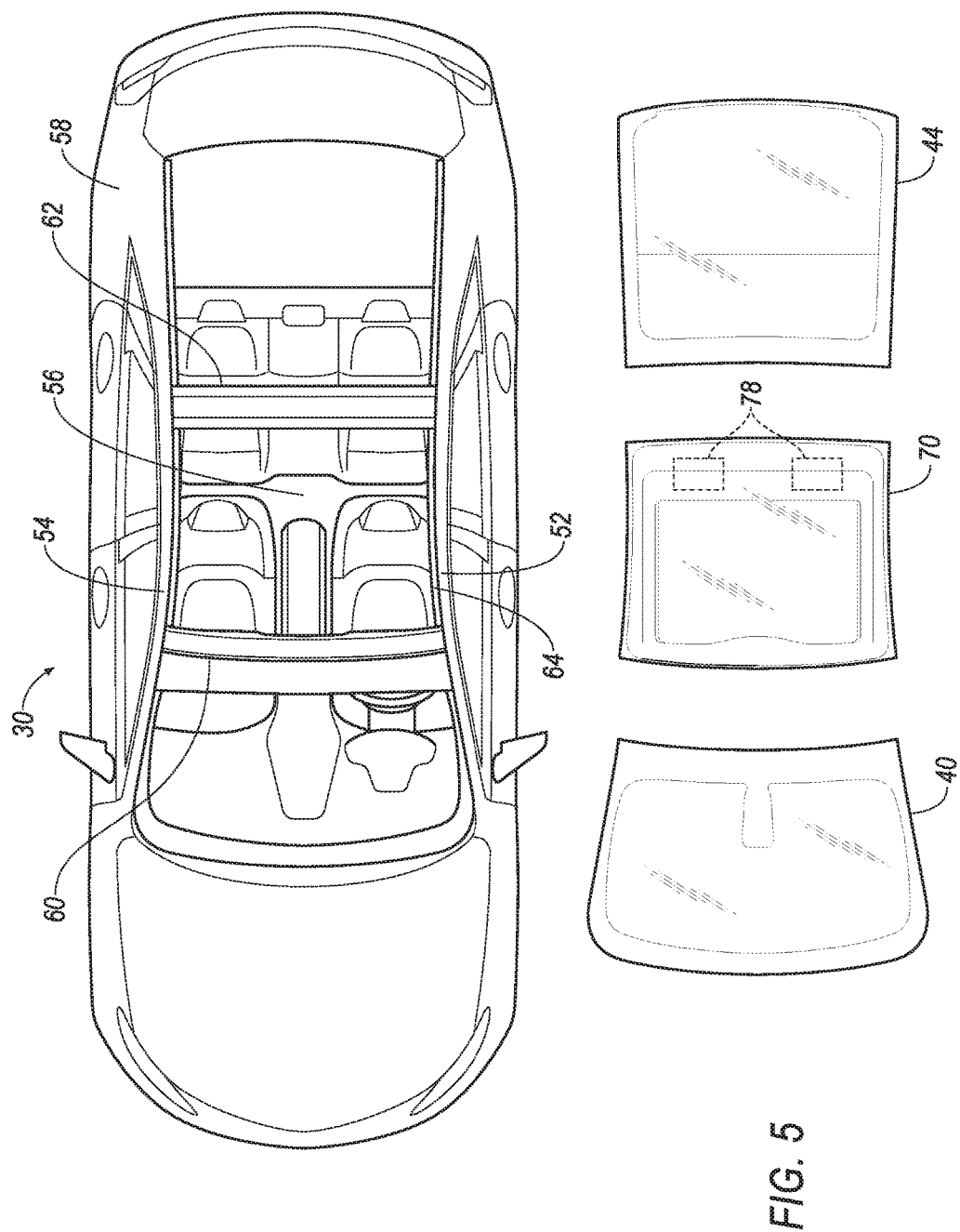
FIG. 5 is a partially exploded top view of the vehicle with a windshield, a backlite, and a moonroof assembly shown exploded from the vehicle.

With reference to FIG. 5, a front cross-member 60 and a rear cross-member 62 each extend from the left end roof rail 52 to the right end roof rail 54. The front cross-member 60 is spaced from the rear cross-member 62 defining the opening 64 therebetween. Specifically, the opening 64 extends from the front cross-member 60 to the rear cross-member 62 and, as set forth above, from the roof rail 52 to the roof rail 54 at the top of the vehicle 30. The opening 64 passes from the passenger cabin 56 outside the vehicle 30.

As shown in FIGS. 1 and 2, the rear cross-member 62 is located forward of a location normally occupied by a head of a rear passenger. This placement of the rear cross-member 62 advantageously provides more headroom and places the backlite 44 above the head of the rear passenger to create an aesthetically pleasing view for the rear passenger and to create an aesthetically pleasing appearance of the vehicle 30 when viewed from the exterior. The forward location of the cross-member 62 may increase the torsional rigidity of the vehicle 30 as well as the performance of the vehicle 30 in roof-crush and side-impact tests. Specifically, in this forward location, the cross-member 62 may be positioned closer to a load path, which may increase vertical load strength, i.e., reduce roof crush. In this forward location, the cross-member 62 may be closer to a side impact load path, which may be centered on the B pillar 48.

The windshield 40 may be formed of any suitable transparent material, e.g., glass, plastic, etc. The windshield 40 faces forward at a front of the passenger cabin 56. The windshield 40 is affixed to the front cross-member 60 and to the A pillars 46 and is adjacent to the hood 32.

Figure 7:
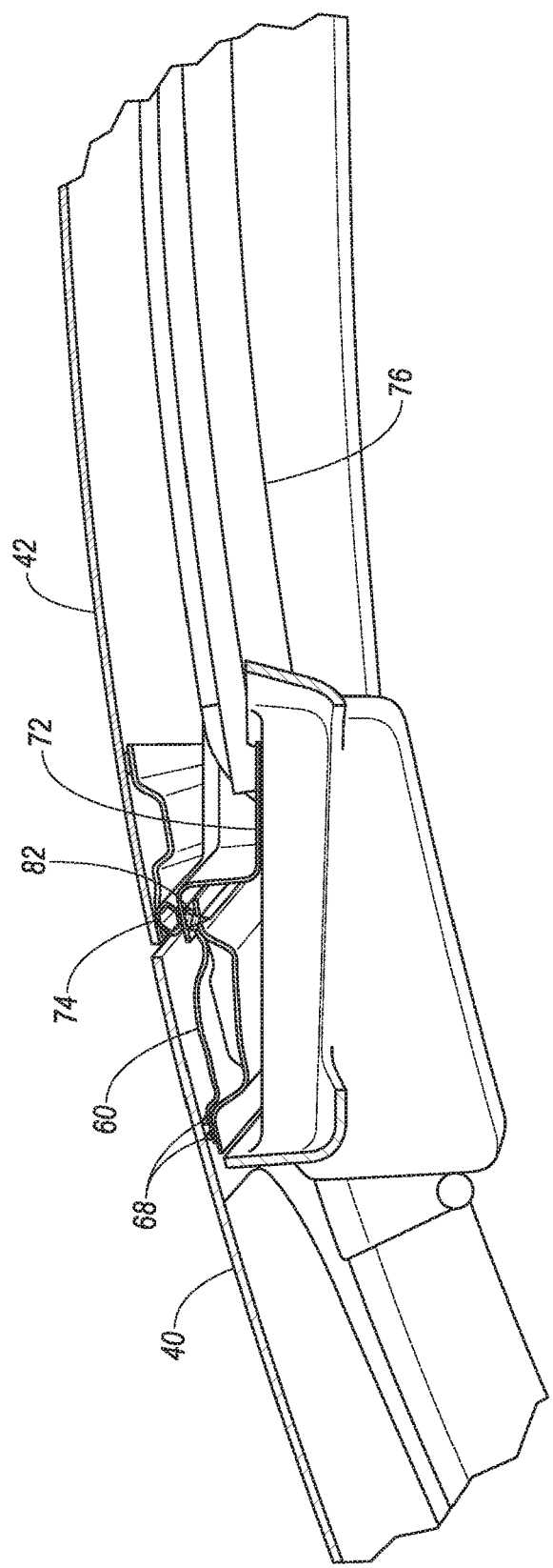
FIG. 7 is a cross-sectional view of the moonroof assembly and the windshield on the vehicle.

The windshield 40 may be affixed to the cross-member 60 and/or the A pillars 46 with adhesive 68. For example, as shown in FIG. 7, the windshield 40 may be affixed to the front cross-member 60 with two beads of adhesive 68 spaced apart from each other and extending along a longitudinal axis of the cross-member 60. Using two beads of adhesive increases a shear plane between the windshield 30 and the front cross-member 60. During operation of the vehicle 30, the windshield 40 may be subjected to various forces, including shear forces, that is, forces along the plane of the windshield 40. The two beads of adhesive 68 may distribute the shear force over a larger surface area of the windshield 40 and the front cross-member 60. However, the adhesive 68 could be one or any suitable number of beads. The adhesive 68 may be of any suitable type.

Figure 8:
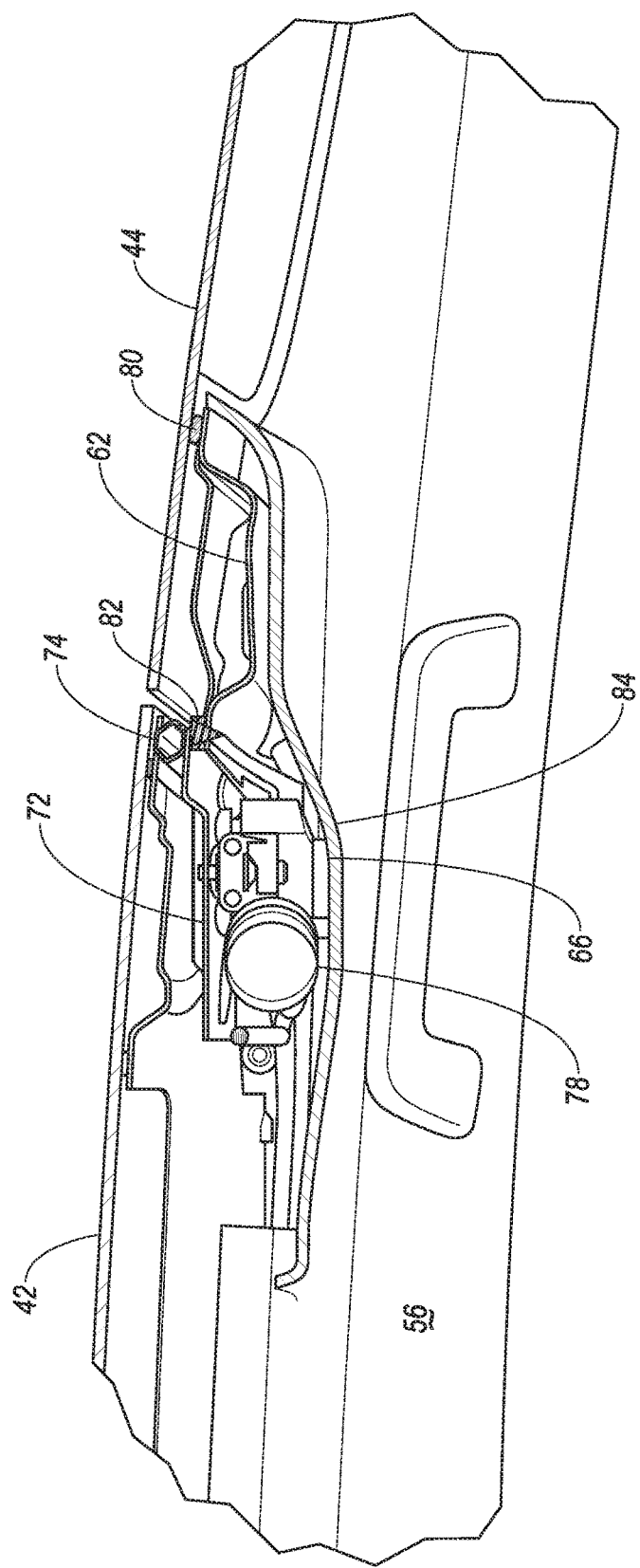
FIG. 8 is a cross-sectional view of the moonroof assembly and the backlite on the vehicle.

As shown in FIG. 8, the backlite 44 may be formed of any suitable transparent material, e.g., glass, plastic, etc. The backlite 44 faces rearward at a rear of the passenger cabin 56. The backlite 44 is spaced from the windshield 40 and is adjacent to the decklid 34. The backlite 44 is affixed to the rear cross-member 62 and to the C pillars 50. For example, the backlite 44 may be affixed to the rear cross-member 62 and/or the C pillars 50 with adhesive 80. The adhesive 80 may be of any suitable type.

Figure 6:
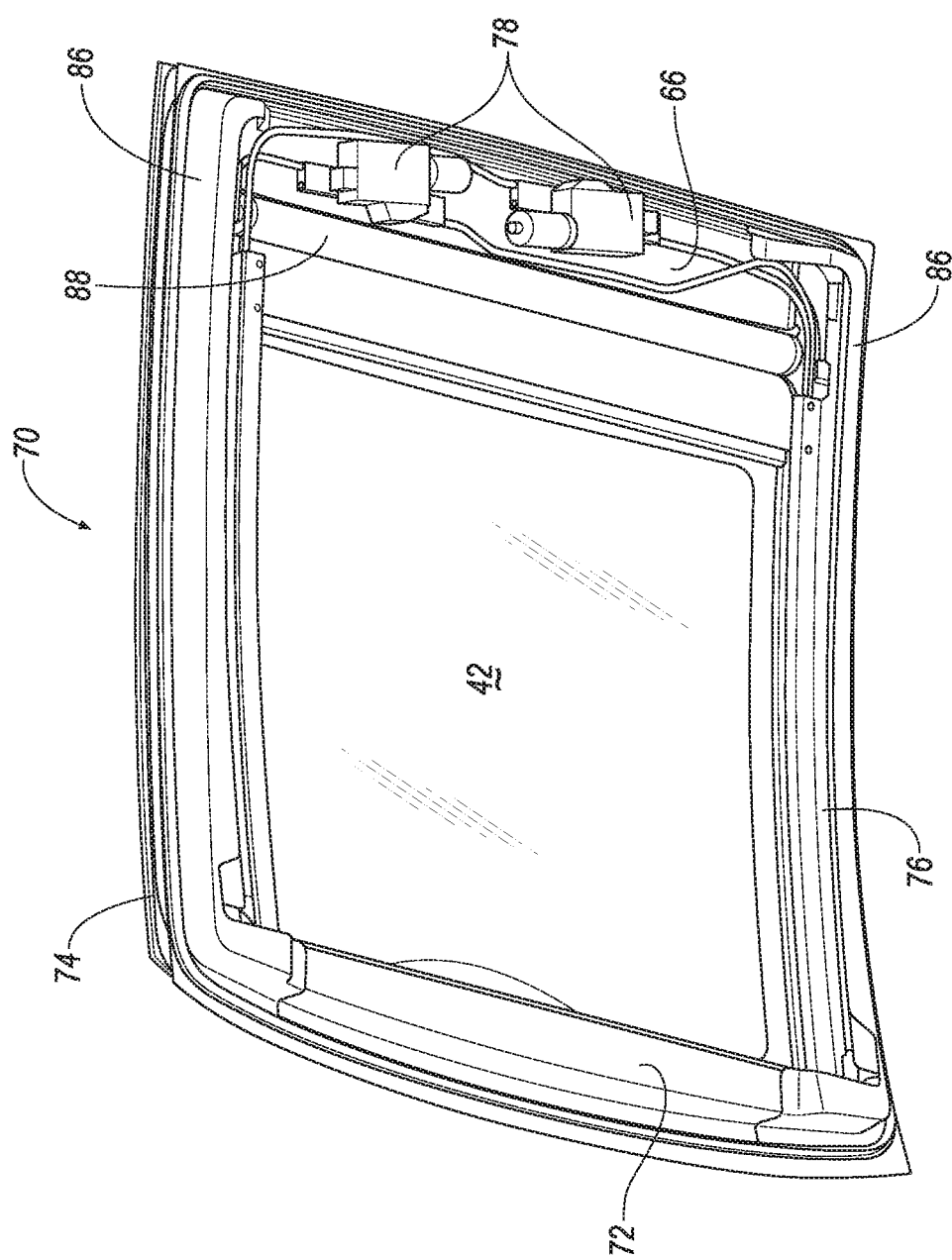
FIG. 6 is a perspective view of the moonroof assembly.

As shown in FIG. 6, the moonroof assembly 70 may include the moonroof 42 supported on a moonroof frame 72. The moonroof assembly 70 may include two tracks 76 extending along a longitudinal axis of the vehicle 30, that is, in the direction of travel of the vehicle 30. The tracks 76 moveably connect the moonroof frame 72 and the moonroof 42. A seal 74 is located between the moonroof frame 72 and the moonroof 42. The seal 74 abuts both the moonroof frame 72 and the moonroof 42 when the moonroof 42 is in the closed position. The seal 74 may be affixed to one of the moonroof frame 72 and the moonroof 42. For example, the seal 74 is affixed to the moonroof frame 72 in FIGS. 7 and 8.

The moonroof frame 72 may be formed of any suitable material, such as steel, aluminum, polymer, etc. The moonroof frame 72 supports the tracks 76. Therefore, the moonroof frame 72 moveably supports the moonroof 42, both indirectly through the tracks 76 and, when the moonroof 42 is in the closed position, directly. The moonroof frame 72 may be fixed to the front cross-member 60, the rear cross-member 62, the left end roof rail 52, and/or the right end roof rail 54 with adhesive 82. The adhesive 82 may be of any suitable type.

The moonroof assembly 70 may include a drive motor 78. The moonroof assembly 70 may include any suitable number of drive motors 78, i.e., one or more. As shown in FIGS. 5 and 6, for example, the moonroof assembly 70 includes two drive motors 78.

The drive motors 78 may be supported on the moonroof frame 72. The drive motors 78 move the moonroof 42 along the tracks 76 between the open and closed positions and/or may drive a shaft roller 88. The motors 78 can be electric motors. The connection between the drive motors 78 and the moonroof 42 can be any suitable moveable mechanical connection, such as gears, pulleys, Bowden cables, etc.

The moonroof 42 may be formed of any suitable material. For example, the moonroof 42 may be formed of a transparent material, e.g., glass, plastic, etc. The transparent material of the moonroof 42 may be the same type of material as the windshield 40 and/or the backlite 44, or may be formed of a different type of material. As another example, the moonroof 42 may be formed of an opaque material, e.g., steel, aluminum, fiber reinforced polymers, etc. The opaque material of the moonroof 42 may be the same type of material as the body 58 of the vehicle 30, or may be formed of a different type of material. The moonroof 42 may also be referred to as a "panel 42." For example, the panel 42 may be transparent or opaque.

Figure 3:
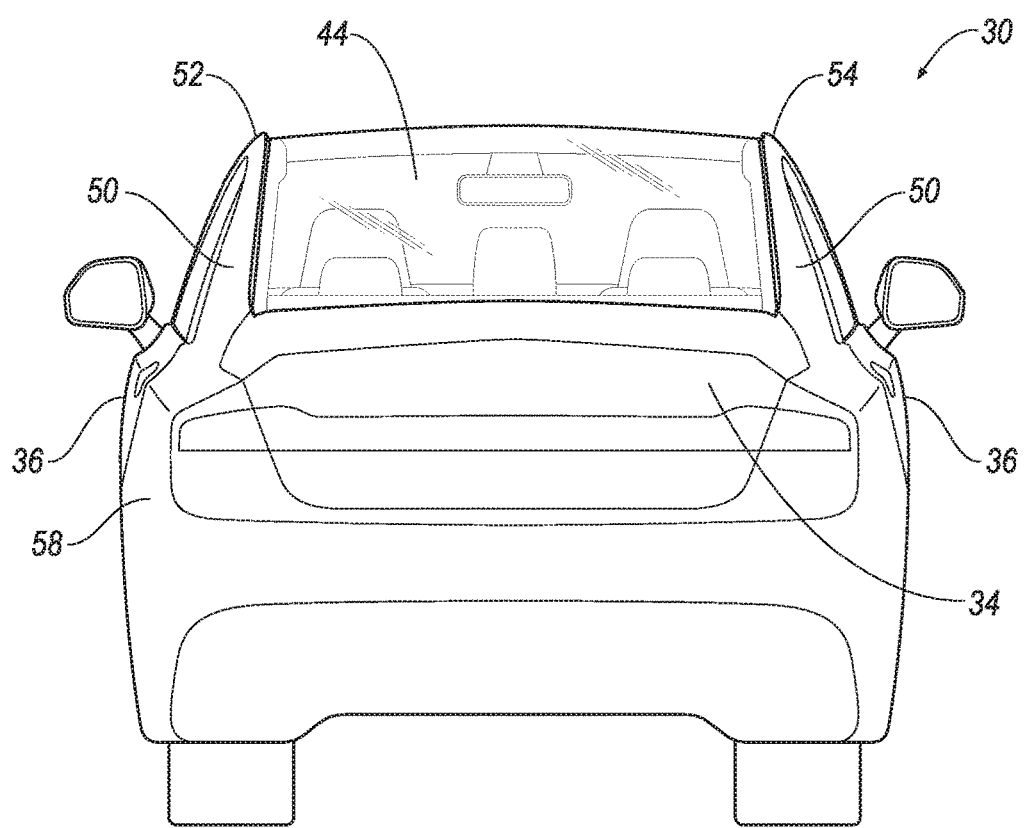
FIG. 3 is a rear view of the vehicle.
Figure 4:
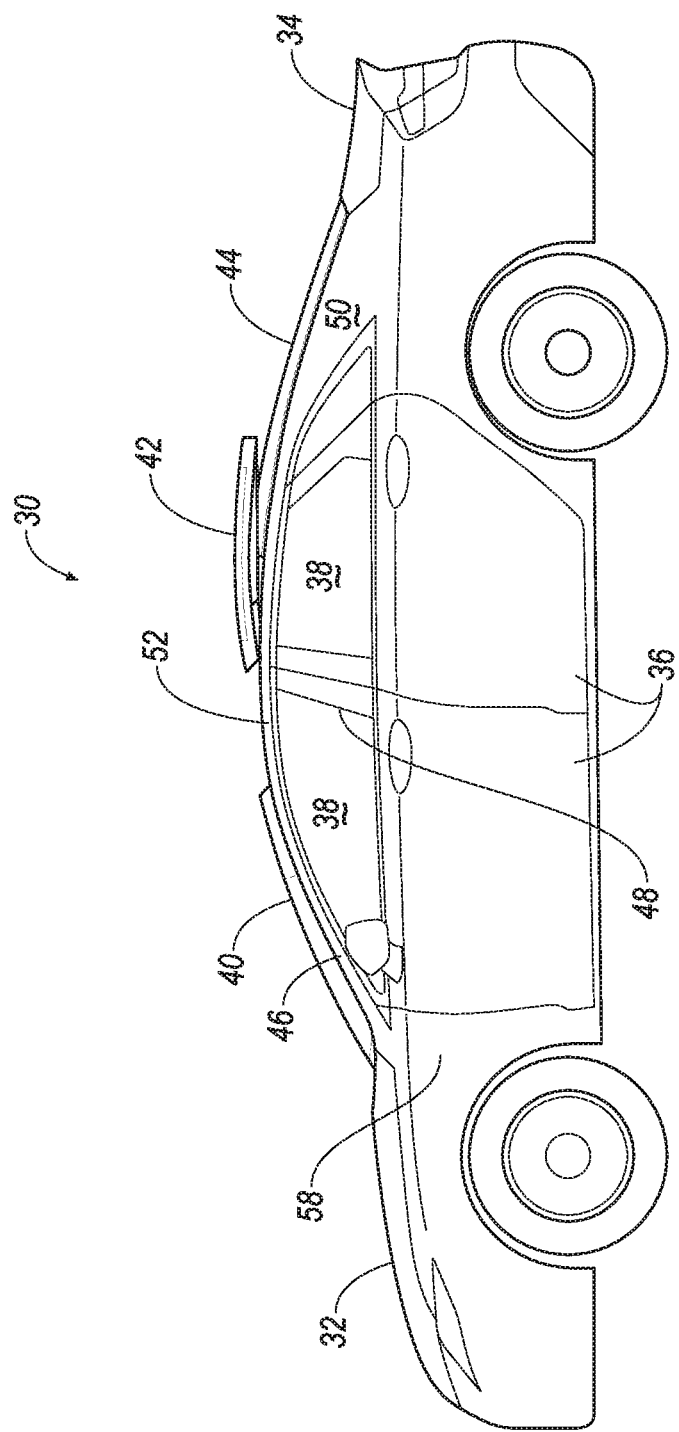
FIG. 4 is a side view of the vehicle with a moonroof in the open position.

As set forth above, the moonroof 42 may be moveable relative to the windshield 40 and the backlite 44 between the closed position shown in FIGS. 1-3 and the open position shown in FIG. 4. Alternatively, the moonroof 42 may be fixed relative to the moonroof frame 72, the windshield 40, and the backlit 44. In the configuration where the moonroof 42, i.e., the panel 42, is fixed and opaque, the moonroof 42 may alternatively be referred to as a "roof" of the vehicle 30, as set forth further below.

In the open position, the moonroof 42 is cantilevered from the moonroof frame 72, that is, the moonroof 42 is fixed at one end and projects outward from that end. In the closed position, the moonroof 42 is adjacent to both the windshield 40 and the backlite 44, so the moonroof 42 borders the windshield 40 and the backlite 44 and there is nothing between the moonroof 42 and the windshield 40 or between the moonroof 42 and the backlite 44. If the moonroof 42 is transparent, then viewed from outside the vehicle 30, the windshield 40, backlite 44, and moonroof 42 provide the appearance of uniform glass across the vehicle 42 from the windshield 40 to the backlite 44. Viewed from in the passenger cabin 56, the windshield 40, backlite 44, and moonroof 42 provide an expansive field of view.

The moonroof assembly 70 is disposed in the opening 64. Specifically, the moonroof frame 72 is fixed relative to the windshield 40 and the backlite 44. The moonroof frame 72 is affixed to the front cross-member 60 and rests on the front cross-member 60, the left end roof rail 52, and the right end roof rail 54. Additional structures or components may be intermediate between the moonroof frame 72 and the front cross-member 60, the left end roof rail 52, and/or the right end roof rail 54. That the moonroof frame 72 rests on the front cross-member 60, the left end roof rail 52, and the right end roof rail 54 is beneficial during the assembly of the vehicle because the moonroof assembly 70 can be installed from above the vehicle 30, that is, a drop-in assembly. In other words, the moonroof assembly 70 may be lowered into the opening 64 of the vehicle 30 as an assembled unit. For example, the adhesive 82 may be applied to the moonroof frame 72 and/or to the front cross-member 60, rear cross-member 62, left end roof rail 52, and/or right end roof rail 54. After this application of the adhesive 82, the assembled moonroof assembly 70 may be lowered into the opening 64 to adhere the moonroof assembly 70 to the vehicle 30.

Since the moonroof assembly 70 may be installed as a drop-in assembly, as described above, the moonroof assembly 70 provides several assembly options for the vehicle 30. In particular, any given vehicle 30 on an assembly line may be outfitted with one of a plurality of types of moonroof assemblies 70. For example, as set forth above, the moonroof 42 may be moveable or fixed and may be transparent or opaque, and may be any combination thereof. As such, any vehicle 30 on the assembly line may be assembled with a moonroof assembly 70 having any combination of a moveable/fixed and transparent/opaque moonroof 42. As set forth above, a fixed opaque moonroof 40 may alternatively be referred to as a "roof."

A shown in FIG. 8, a headliner 84 above the passenger cabin 56 is attached to the cross-member 62. The headliner 84 may be formed of felt covering a plastic shell or any suitable material.

A compartment 66 extends between the headliner 84 and the moonroof frame 74. The compartment 66 may be defined, at least in part, by the moonroof frame 74 and the headliner 84. The compartment 66 may extend from the left end roof rail 52 to the right end roof rail 54. Specifically, the moonroof frame 74 may include side rails 86 adjacent the left end roof rail 52 and the right end roof rail 54, and the compartment may extend between side rails 86 from the left end roof rail 52 to the right end roof rail 54, as shown in FIG. 6. The compartment 66 is disposed at the rear cross-member 62 between the front cross-member 60 and the rear cross-member 62. The compartment 66 is located forward of a location normally occupied by a head of a rear passenger.

Upon assembly, the drive motors 78 and the roller shade 88 are in the compartment 66. The compartment 66 facilitates drop-in assembly of the moonroof assembly 70 with the vehicle 30 by providing a space for the drive motors 78 and the roller shade 88 to drop into. The motors 78 and the roller shade 88 may be aligned lengthwise with the compartment allowing the compartment 66 to be located forward of the headroom of a rear passenger without impinging on the view out of the moonroof 42. The motors 78 may be located side-by-side spaced from each other between the left end roof rail 52 and the right end roof rail 54, as shown in the figures.

As set forth above, the compartment 66 extends from the left end roof rail 52 to the right end roof rail 54. Accordingly, the moonroof assembly 70 may be designed with the drive motors 78 in any suitable position from the left end roof rail 52 to the right end roof rail 54. Because the drive motors 78 may be located at any suitable location between the left end roof rail 52 and the right end roof rail 54, the packaging and location of the drive motors 78 may be designed to increase headroom for rear passengers. The packaging and location of the drive motors 78 may also designed to increase ease of ingress and egress through the door 36.

The drive motors 78 may be supported on the rear cross-member 62. In other words, the drive motors 78 may be supported on the same rear cross-member 62 that supports the backlite 44.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a frame including a left end roof rail and a right end roof rail;
   a windshield;
   a backlite spaced from the windshield, the backlite including a front edge;
   a moonroof moveable relative to the windshield and the backlite between a closed position and an open position;
   wherein, when the moonroof is in the closed position, the moonroof includes a front edge juxtaposed with the windshield and a rear edge juxtaposed with the front edge of the backlite; and
   two front doors and two rear doors, wherein, when the moonroof is in the closed position, the rear doors each include a rear edge that extends to the respective roof rail at a vehicle-rearward position relative to the front edge of the backlite;
   a moonroof frame fixed relative to the windshield and the backlite and supporting the moonroof, wherein, when in the open position, the moonroof is cantilevered from the moonroof frame above the backlite;
   a cross member extending from the left end roof rail to the right end roof rail, the cross member having a vehicle-forward end and a vehicle-rearward end;
   the moonroof frame being affixed to the vehicle-rearward end; and
   the windshield being affixed to the vehicle-forward end, and the windshield extending from the vehicle-forward end to the vehicle-rearward end.

2. A vehicle according to claim 1, wherein the moonroof is one-piece from the windshield to the backlite when in the closed position.

3. A vehicle according to claim 1, further comprising a track extending longitudinally along the moonroof frame and moveably connecting the moonroof frame and the moonroof.

4. A vehicle according to claim 1, further comprising a seal between the moonroof and the moonroof frame.

5. A vehicle according to claim 1, wherein the left end roof rail and the right end roof rail are spaced apart to define an opening between the windshield and the backlite, the moonroof frame being disposed in the opening.

6. A vehicle according to claim 5, wherein the opening extends continuously from the left end roof rail to the right end roof rail.

7. A vehicle according to claim 1, wherein the moonroof is transparent.

8. A vehicle according to claim 7, wherein the left end roof rail and the right end roof rail are spaced apart to define an opening between the windshield and the backlite, the moonroof frame being disposed in the opening.

9. A vehicle according to claim 8, wherein the opening extends continuously from the left end roof rail to the right end roof rail.

10. A vehicle comprising:
    a frame including a left end roof rail and a right end roof rail;
    a windshield;
    a backlite spaced from the windshield, the backlite including a front edge;
    a moonroof moveable relative to the windshield and the backlite between a closed position and an open position;
    wherein, when the moonroof is in the closed position, the moonroof includes a front edge juxtaposed with the windshield and a rear edge juxtaposed with the front edge of the backlite;
    two front doors and two rear doors, wherein, when the moonroof is in the closed position, the rear doors each include a rear edge that extends to the respective roof rail at a vehicle-rearward position relative to the front edge of the backlite;
    a rear seat having a seatback disposed at a vehicle-rearward position relative to the front edge of the backlite; and a moonroof frame fixed relative to the windshield and the backlite and supporting the moonroof, wherein, when in the open position, the moonroof is cantilevered from the moonroof frame above the backlite;

a cross member extending from the left end roof rail to the right end roof rail, the cross member having a vehicle-forward end and a vehicle-rearward end;

the moonroof frame being affixed to the vehicle-rearward end; and the windshield being affixed to the vehicle-forward end, and the windshield extending from the vehicle-forward end to the vehicle-rearward end.

11. A vehicle according to claim 10, wherein the left end roof rail and the right end roof rail are spaced apart to define an opening between the windshield and the backlite, the moonroof frame being disposed in the opening.

12. A vehicle according to claim 11, wherein the opening extends continuously from the left end roof rail to the right end roof rail.

13. A vehicle according to claim 10, wherein the moonroof is one-piece from the windshield to the backlite when in the closed position.

14. A vehicle according to claim 10, wherein the moonroof is transparent.

* * * * *